July 21, 1942.  E. H. LAW  2,290,689
HAIR CLIPPING OR SHAVING DEVICE
Filed Nov. 13, 1939
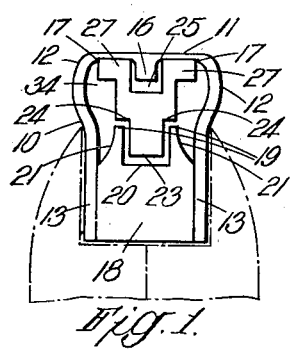
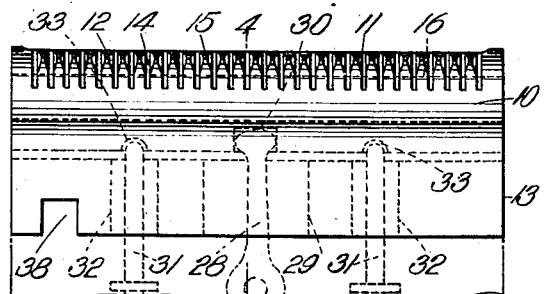
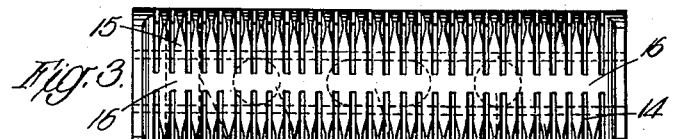
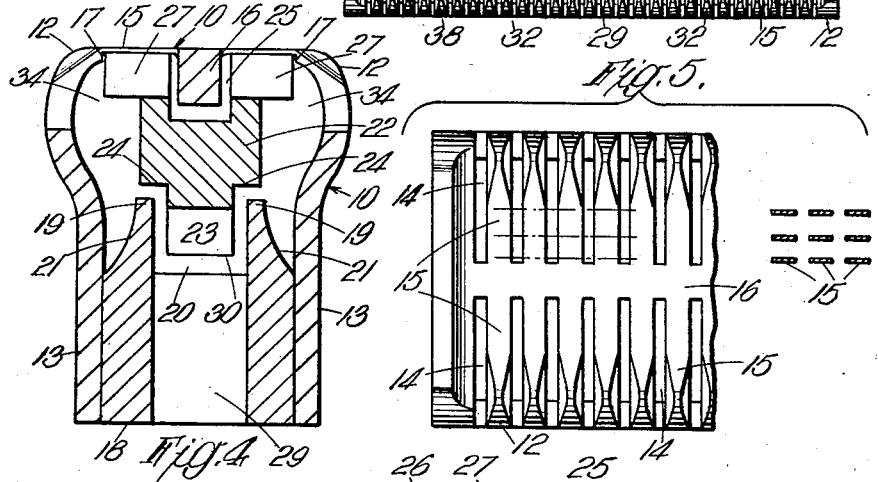
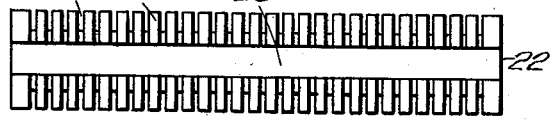
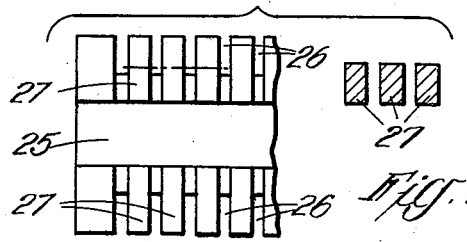
INVENTOR:
EDGAR HAROLD LAW
BY: Haseltine, Lake & Co.
ATTORNEYS Patented July 21, 1942

2,290,689

UNITED STATES PATENT OFFICE 2,290,689

HAIR CLIPPING OR SHAVING DEVICE

Edgar Harold Law, Gerrards Cross, England, assignor to Rolls Razor Limited, London, England, a British company Application November 13, 1939, Serial No. 304,084
In Great Britain November 11, 1938

2 Claims. (Cl. 30—43)

(Granted under the provisions of sec. 14, act of March 2, 1927; 357 O. G. 5)

This invention relates to shaving or hair cutting devices of the kind known as "dry shavers" which are used without soap and water or shaving creams, and which comprise an outer cutter or shearing member or guard having a number of blades and a reciprocatory inner cutter or shearing member also having blades that bear against and co-operate with the blades of the outer cutter, the device being adapted to be held in the hand and pressed against the face with the outer surface of the outer cutter bearing against the skin so that the hairs are pressed outwardly and are cut between the blades of the inner and outer cutters or shearing members.

The chief object of the present invention is to provide an improved cutter head which is so constructed as to reduce or prevent the tendency for cut hairs to fall between the moving inner cutter and the adjacent stationary parts, thus avoiding likelihood of clogging of the cutters.

According to the invention, the improved cutter or shearing head comprises an outer cutter constituted by an arch-shaped piece having slits in the transverse portion to form transverse blades and also having depending side walls, a base portion joining said side walls to form a tunnel, an inner cutter spaced from said side walls and slidably movable in said tunnel and having blades co-operating with said outer cutter blades, and upstanding walls on said base portion spaced apart to receive the lower part of the inner cutter and spaced apart from said side walls of the outer cutter to form pockets for cut hairs between the outer surfaces of said upstanding walls and the inner faces of said side walls of the outer cutter to receive cut hairs falling from the blades through the space between the inner cutter and the side walls communicating with the said pockets.

In such a cutter head the said outer surfaces of the upstanding walls on the base portion are preferably curved to direct the cut hairs towards the side walls of the outer cutter and the outer surfaces of the inner cutter are disposed above and at least extend to the curved surfaces of the upstanding walls.

In order that the invention may be clearly understood and readily carried into effect, the same will now be more fully described with reference to the accompanying drawing, in which:

Figures 1, 2 and 3 are respectively an end view, a side view and a plan view of one embodiment of the improved cutter head, all the views showing the cutter head on an enlarged scale.

Figure 4 is a transverse sectional view of the cutter head taken on the line 4—4 of Figure 2, on a much enlarged scale.

Figure 5 represents a fragmentary plan view illustrating more particularly the outer cutter blades of which cross-sectional views are also shown.

Figure 6 is an enlarged plan of the inner cutter.

Figure 7 is a view similar to Figure 5, but illustrating the blades of the inner cutter.

In the said drawing, the reference numeral 10 generally indicates the outer cutter which, as shown, comprises a flat, skin-contacting surface or part 11, which merges into curved portions 12 from which latter extend side walls 13. In the part 11, a series of transverse slits 14 are cut to form blades 15 on each side of a medially disposed longitudinal bar or rib 16 which, as shown, projects below the lower surface of the blades 15, the said slits extending around the curved portions or corners 12 to the position shown in Figure 4 adjacent the side walls. As seen from Figure 4, the underside of the flat part 11 is formed to provide two steps or shoulders 17 and the portions between the bar or rib 16 and the steps 17 constitute the actual cutting or shearing portions of the blades. This formation of outer cutter is preferably produced by cutting a solid rectangular bar to form first a U-shaped or arched piece with the longitudinal rib or bar 16 on the transverse portion, then radiusing the corners, then pressing the U-shaped or arched piece to provide the curved or bulged corner portions on each side which give the appearance of a flattened tube at the upper part, then slitting first at the corner and then along the flat part 11 to as far as the bar 16 to form the blades 15. The inner or under face of the blade portions on each side of the bar 16 are then ground to form the thin blades or cutting edges and the steps or shoulders 17. A base 18 is inserted between the side walls 13 and is welded or otherwise secured in position to form with the U-shaped or arched piece a complete tunnel or tube to receive the inner cutter. This base has upstanding walls 19 on its upper surface to form a channel 20 between them, their outer faces being curved as shown at 21, to space them from the side walls 13 and to form side pockets or cavities.

The inner cutter which is generally indicated at 22 is cut from a solid rectangular strip or bar to have the sectional form shown most clearly in Figure 4. The lower part of the inner cutter has a depending rib 23 which is disposed in the channel 20 between the walls 19 on the base 18 so that shoulders 24 on each side of the rib 23 are disposed above the upper edges of the walls 19 whilst the width of the main part at 22 is such that its sides which are spaced from the side walls 12 of the outer cutter are flush with or project laterally beyond the upper ends of the curved faces 21 of the walls 19. The upper part of the inner cutter is of T-shape and it has a medially disposed groove 25 which receives the longitudinal bar or rib 16 on the outer cutter and on each side of this groove are a number of slits 26 forming laterally extending or overhanging blades or fingers 27 which are adapted to bear against the flat under surfaces of the blades 15 of the outer cutter between the bar 16 and the steps 17. The upper edges of the inner cutter blades 27 and the lower edges of the outer cutter blades 15 form the co-operating shearing or cutting edges which cut or sever the hairs. The outer cutter blades which, as shown, are flat along the parts engaged by the inner cutter blades, i. e. between the stepped parts 17 and the bar 16 are preferably of uniform depth and width and their actual cutting edges are parallel (see Figure 5). The overhanging portions of the inner cutter blades are also of uniform width and thickness or depth and they also have parallel cutting edges which are parallel with the parallel cutting edges of the outer cutter blades 15.

The inner cutter makes an easy fit in the outer cutter although it may to some extent be guided by the steps 17 and/or the walls 19 on the base 18, during its reciprocation by an oscillatory lever 28, shown by dotted lines, which passes through a hole 29 and engages with an opening 30 in the bottom of the inner cutter. The said oscillatory lever forms part of the mechanical or electrical driving mechanism contained within the casing of the dry shaver, in which casing the cutter head is detachably fixed in known manner. The inner cutter blades 27 are, however, adapted to be pressed close against the outer cutter blades 15 by spring pressed rods 31 extending from inside the aforesaid casing through holes 32 in the base 18 of the outer cutter and engaging recesses 33 in the bottom of the inner cutter. During the reciprocation of the inner cutter which may be effected by mechanically or electrically operated means as aforesaid, the flat outer surface 11 of the outer cutter is pressed against the skin and the hair passes or projects into the slits 14 and is severed or cut between the aforesaid moving blades or shearing edges of the inner cutter blades and the stationary blades or shearing edges of the outer cutter. At or about the position where the blades of the outer cutter merge into the curved portions 12, that is, beyond the steps 17, the outer cutter slits 15 are wider so that the intervening portions are narrower than the slits. These wider parts of the slits serve as guiding openings so that some hairs to be cut can be guided into the path of the reciprocatory inner cutter, whilst other hairs will pass direct through the slits 14, so as to be cut or sheared between the co-operating edges of the teeth or blades of the inner and outer cutters.

It will be seen from Figure 4 that there are cavities or spaces 34 of substantial volume below the cutting blades and between the outer cutter walls 13 and the sides of the inner cutter into which spaces cut hairs can fall, and as the sides of the inner cutter are flush with, or project beyond, the upper ends of the curved side surfaces 21 of the walls 19, the cut hairs fall into the collecting cavities or pockets adjacent these curved surfaces 21, which latter direct the cut hairs towards the side walls 13 so that they are not likely to pass or collect between the shoulders 24 and the upper ends of the walls 19, thus avoiding or reducing any tendency of the cutters to be clogged. In order to give some idea of the relative sizes, the slits 14 and blades 15 of the outer cutter may be about eight-thousandths of an inch and twenty-four-thousandths of an inch respectively, whilst the slits and blades of the inner cutter may be fourteen-thousandths and eighteen-thousandths of an inch respectively. It will be appreciated that by the grinding of the inner surface of the flat part 11 of the outer cutter, the blades 15 are made extremely thin and the longitudinal bar or rib 16 serves to strengthen them between the points of support at the bar and the thicker or stepped portions 17. The base 18 may also have a slot or opening 38 which can register and engage with a projection within the groove at the upper part of the casing of the dry shaving device, so as to locate the cutter head in the correct position wherein it is held by a screw supported in the casing of the device bearing against the lower part of the cutter head. The cutter head when the dry shaver is not in use may be protected by a shield which is of channel section and curved at its sides to fit along the curved sides of the cutter head. The end portions of the guard may be split so as to provide resilient portions which may have inwardly disposed projections adapted to bear against the end portions of the side walls of the outer cutter to retain the guard in the required position, the resilient ends permitting of the guard being slidably moved along the outer cutter for the purpose of removing it or placing it in the required position.

It will be appreciated that the blades 15 of each set on the outer cutter are supported at both ends, i. e. by the bar or rib 16 and by the side walls 13 and the corner portions 12, but the ends of the blades of the inner cutter are free at their outer ends. The inner cutter blades 27 are made robust as shown, so that they are not likely to be damaged when the inner cutter is removed from the outer cutter.

What I claim and desire to secure by Letters Patent of the United States is:

1. A cutter head for a dry shaving device comprising an outer cutter constituted by an arch-shaped piece having slits in the transverse portion to form transverse blades and also having depending side walls, a base portion joining said side walls to form a tunnel, an inner cutter spaced from said side walls and slidably movable in said tunnel and having blades co-operating with said outer cutter blades, and upstanding walls on said base portion spaced apart to receive the lower part of the inner cutter and spaced apart from said side walls of the outer cutter to form pockets for cut hairs between the outer surfaces of said upstanding walls and the inner faces of said side walls of the outer cutter to receive cut hairs falling from the blades through the space between the inner cutter and the side walls communicating with the said pockets.

2. A cutter head as in claim 1, in which the said outer surfaces of the upstanding walls on the base portion are curved to direct the cut hairs towards the side walls of the outer cutter and wherein the outer surfaces of the inner cutter are disposed above and at least extend to the curved surfaces of the upstanding walls.

EDGAR HAROLD LAW.